US012680956B2

(12) United States Patent
Yokoyama et al.

(10) Patent No.: US 12,680,956 B2
(45) Date of Patent: Jul. 14, 2026

(54) OPTICAL MEASUREMENT DEVICE AND OPTICAL MEASUREMENT METHOD

(71) Applicant: USHIO DENKI KABUSHIKI KAISHA, Tokyo (JP)

(72) Inventors: Takuma Yokoyama, Tokyo (JP); Katsuya Watanabe, Tokyo (JP)

(73) Assignee: USHIO DENKI KABUSHIKI KAISHA, Tokyo (JP)

( * ) Notice: Subject to any disclaimer, the term of this patent is extended or adjusted under 35 U.S.C. 154(b) by 182 days.

(21) Appl. No.: 18/554,406

(22) PCT Filed: Mar. 15, 2022

(86) PCT No.: PCT/JP2022/011499
§ 371 (c)(1),
(2) Date: Oct. 6, 2023

(87) PCT Pub. No.: WO2022/215453
PCT Pub. Date: Oct. 13, 2022

(65) Prior Publication Data
US 2024/0110866 A1 Apr. 4, 2024

(30) Foreign Application Priority Data

Apr. 7, 2021 (JP) ................................. 2021-065267

(51) Int. Cl.
*G01N 21/39* (2006.01)
*G01J 3/02* (2006.01)
(Continued)

(52) U.S. Cl.
CPC .............. *G01N 21/39* (2013.01); *G01J 3/108* (2013.01); *G01N 21/47* (2013.01); *G01N 21/85* (2013.01);
(Continued)

(58) Field of Classification Search
CPC ...... G01N 21/39; G01N 21/85; G01N 21/359; G01N 2021/1789; G01N 2201/06113;
(Continued)

(56) References Cited

U.S. PATENT DOCUMENTS

2004/0207850 A1* 10/2004 Kwak .................. G01N 21/636
356/432
2009/0185163 A1* 7/2009 Shimazu ............ G01N 21/3563
356/369
(Continued)

FOREIGN PATENT DOCUMENTS

JP S62-105017 A 5/1987
JP 3436326 B2 * 8/2003 ........... G01N 21/896
(Continued)

OTHER PUBLICATIONS

International Search Report issued in PCT/JP2022/011499; mailed Jun. 7, 2022.
(Continued)

*Primary Examiner* — Tarifur R Chowdhury
*Assistant Examiner* — Kaitlyn E Kidwell
(74) *Attorney, Agent, or Firm* — Studebaker Brackett PLLC

(57) ABSTRACT

An illumination device irradiates a predetermined area with measurement light whose wavelength changes over time. A light reception device includes an optical sensor that detects diffuse transmission light of an object located in the predetermined area. The light reception device is structured such that the optical sensor receives a component of the diffuse transmission light through the object which propagates in a direction deviated from an optical axis of the measurement light.

8 Claims, 11 Drawing Sheets

(51) Int. Cl.

| | |
|---|---|
| *G01J 3/10* | (2006.01) |
| *G01J 3/18* | (2006.01) |
| *G01N 21/17* | (2006.01) |
| *G01N 21/3563* | (2014.01) |
| *G01N 21/359* | (2014.01) |
| *G01N 21/47* | (2006.01) |
| *G01N 21/85* | (2006.01) |

(52) U.S. Cl.
CPC ........... *G01J 3/0218* (2013.01); *G01J 3/0264* (2013.01); *G01J 3/1895* (2013.01); *G01N 2021/1789* (2013.01); *G01N 21/3563* (2013.01); *G01N 21/359* (2013.01); *G01N 2021/4711* (2013.01); *G01N 2021/4735* (2013.01); *G01N 2201/06113* (2013.01)

(58) Field of Classification Search
CPC ........... G01N 21/47; G01N 2021/4711; G01N 2021/4735; G01N 21/3563; G01J 3/0218; G01J 3/0264; G01J 3/1895; G01J 3/108
USPC ......................................................... 356/432

See application file for complete search history.

(56) References Cited

U.S. PATENT DOCUMENTS

| | | | | | |
|---|---|---|---|---|---|
| 2010/0290032 | A1* | 11/2010 | Bugge | ................... | G01N 21/85 |
| | | | | | 356/337 |
| 2020/0278290 | A1* | 9/2020 | Imai | ................... | G01N 21/9508 |
| 2022/0170791 | A1 | 6/2022 | Yamada et al. | | |
| 2022/0178848 | A1 | 6/2022 | Yamada et al. | | |

FOREIGN PATENT DOCUMENTS

| | | | | | |
|---|---|---|---|---|---|
| JP | 4031191 | B2 * | 1/2008 | ............. | G01N 21/01 |
| JP | 2011-149822 | A | 8/2011 | | |
| JP | 2019-219190 | A | 12/2019 | | |
| JP | 2020-159971 | A | 10/2020 | | |
| JP | 2020-159973 | A | 10/2020 | | |
| JP | 2020-159976 | A | 10/2020 | | |
| JP | 2021028572 | A * | 2/2021 | ......... | G01N 21/3563 |
| WO | 2018/135233 | A1 | 7/2018 | | |
| WO | WO-2020075440 | A1 * | 4/2020 | ............. | G01N 21/85 |

OTHER PUBLICATIONS

International Preliminary Report on Patentability (Chapter I) and Written Opinion of the International Searching Authority issued in PCT/JP2022/011499; issued Oct. 10, 2023.

* cited by examiner

OPTICAL MEASUREMENT DEVICE AND OPTICAL MEASUREMENT METHOD

BACKGROUND

1. Technical Field

The present disclosure relates to an optical measurement device.

2. Description of the Related Art

Spectrophotometric analysis is widely used for component analysis and inspection of an object. According to spectrophotometric analysis, an object is irradiated with measurement light, and a spectrum of object light obtained as a result of the irradiation is measured. Furthermore, it is possible to obtain optical characteristics such as reflection characteristics (wavelength dependency) or transmission characteristics based on the relationship between the spectrum of the object light and the spectrum of the measurement light.

Spectrophotometric analysis is classified into a transmission type in which transmission light through an object is measured as object light, and a reflection type in which reflected light from the object is measured as object light. Although the reflection type is suitable for measuring an object having a high reflectance, the obtained optical information is limited to information obtained near a top surface of the object. Therefore, it cannot be said that the reflection type has sufficient accuracy for measurement of an object such as precise industrial products, specimens collected from plants and animals, materials taken in the bodies by people, and a liquid or a gas manufactured at production plants.

The transmission type can obtain optical characteristics including not only optical characteristics on a top surface of an object, but also optical characteristics at a deep portion of the object, and thus is suitable for a case where, for example, food and drink (hereinafter, collectively referred to as food and drink) are objects. Patent Literature 1 (JP2020-159971A) and Patent Literature 2 (JP2020-159973A) disclose transmission-type product inspection devices. This product inspection device includes an irradiation optical system that irradiates a top surface of a product (inspection object) with pulse light, and a light receiver that is provided below the product and receives light having transmitted through the product.

As a result of studying the transmission-type inspection device, the inventors of the present invention have recognized the following problems. According to a conventional inspection device, when an object does not exist, measurement light directly enters the light receiver. In a case where a product such as food and drink having a low transmittance is an inspection object, while it is necessary to increase the intensity of measurement light to secure a sufficient S/N ratio, when an inspection object does not exist, the measurement light having a very high intensity enters the optical sensor (photoelectric conversion element) in the light receiver, and causes a failure of the optical sensor in some cases. Therefore, it is necessary to take a measure for protecting the optical sensor.

Measures for solving this problem are considered to include (i) controlling an operation/stop of a light source in a time division manner in synchronization with whether or not an inspection object exists, (ii) providing an optical shutter (or a dimmer), and shielding (or dimming) the measurement light in synchronization with whether or not the inspection object exists, and the like. However, when a large amount of products need to be inspected at a high speed, it is difficult to perform control in synchronization with whether or not an inspection object exists. Furthermore, addition of a component such as an optical shutter causes an increase in cost or introduces new uncertainty into the inspection device, and therefore is not preferable.

SUMMARY

The present disclosure has been made in view of the above problem, and one of exemplary objects of an aspect of the present disclosure is to provide an optical measurement device and an optical measurement method that can protect an optical sensor.

One aspect of the present disclosure relates to an optical measurement device. The optical measurement device includes: an illumination device structured to irradiate a predetermined area with measurement light whose wavelength changes over time; and a light reception device including an optical sensor structured to detect diffuse transmission light through an object located in the predetermined area. The light reception device is structured such that the optical sensor receives a component of the diffuse transmission light through the object which propagates in a direction deviated from an optical axis of the measurement light.

Another aspect of the present disclosure is an optical measurement method. This method includes: a step of generating measurement light whose wavelength changes over time; a step of repeatedly irradiating a predetermined area with the measurement light having a certain intensity; a step of conveying an object so as to pass through the predetermined area; and a step of, at an optical sensor, detecting diffuse transmission light through the object. The detecting step is performed such that a light reception amount of the optical sensor at a time when the object is in the predetermined area is larger than a light reception amount of the optical sensor at a time when the object is not in the predetermined area.

Note that any combination of the above components and mutual replacement of the components and expressions of the present disclosure between methods, devices, systems, and the like are also effective as aspects of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

Outline of Embodiments

Figure 1:
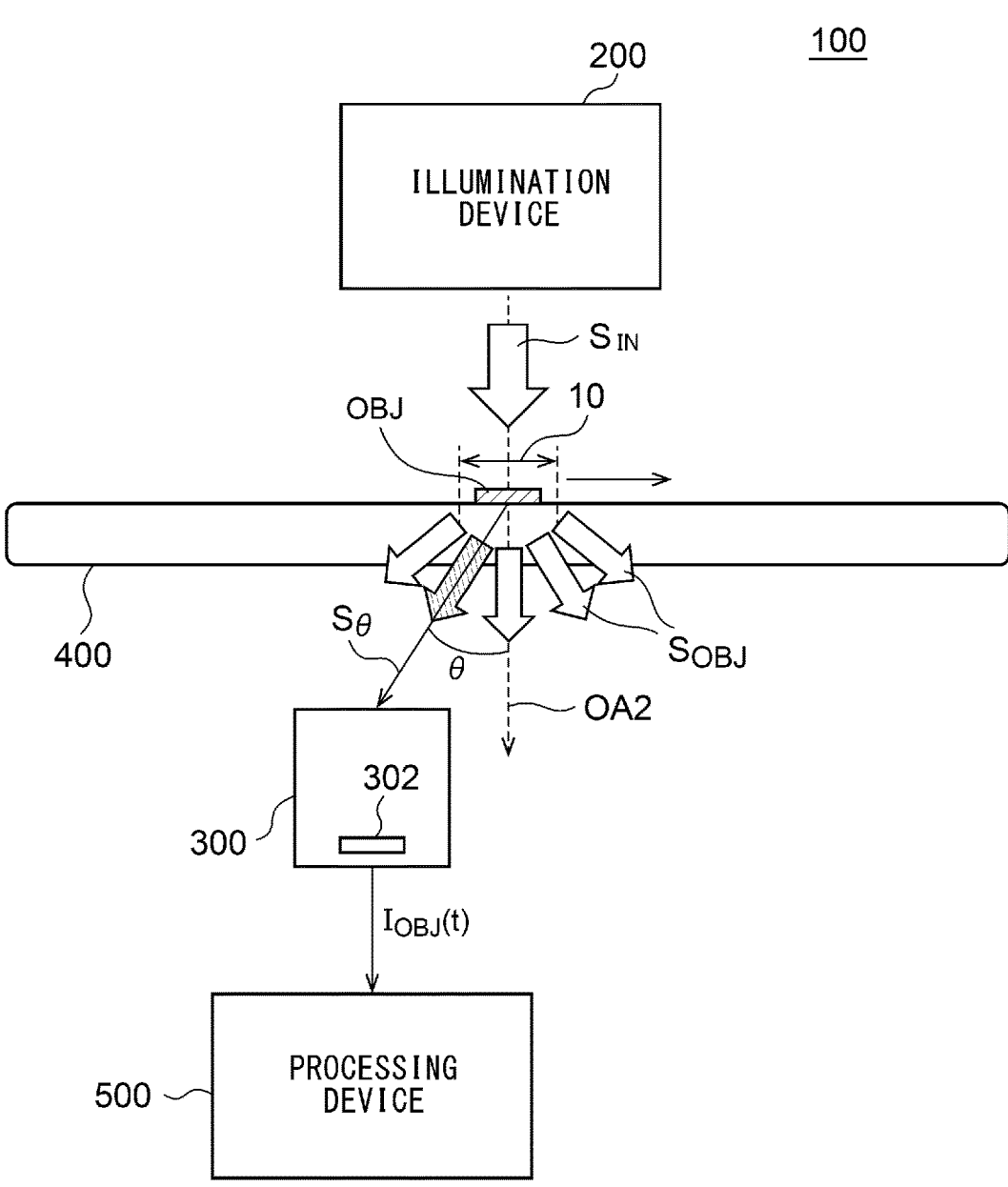
FIG. 1 is a block diagram of an optical measurement device according to an embodiment.

An overview of some exemplary embodiments of the present disclosure will be described. This outline will simplify and describe some concepts of one or a plurality of embodiments for the purpose of basic understanding of the embodiments as an introduction to the detailed description to be described later, and does not limit the breadth of the invention or the disclosure. Furthermore, this outline is not a comprehensive outline of all conceivable embodiments, and does not limit the essential components of the embodiments. For the sake of convenience, "one embodiment" is used in some cases to refer to one embodiment (an example or a modified example) or a plurality of embodiments (examples or modified examples) disclosed in this description.

An optical measurement device according to one embodiment includes an illumination device that irradiates a predetermined area with measurement light whose wavelength changes over time, and a light reception device including an optical sensor that detects diffuse transmission light through an object located in the predetermined area. The light reception device is structured such that the optical sensor receives a component of the diffuse transmission light through the object which propagates in a direction deviated from an optical axis of the measurement light. Note that "structured" is not limited to a case where there is a feature in the configuration, and includes a case where there are features in both the structure and arrangement, a case where there is a feature only in the arrangement, and the like.

According to this optical measurement device, when the object exists, the object light attenuated by the object enters the optical sensor, and, when the object does not exist, the measurement light does not enter the optical sensor, or even when the measurement light enters the optical sensor, the intensity is very weak, so that it is possible to protect the optical sensor. Furthermore, it is possible to cause the illumination device to continuously operate regardless of whether or not the object exists, and a shutter or the like synchronized with whether or not the object exists is unnecessary.

In one embodiment, the light reception device may further include a condenser optical system. This condenser optical system has an optical axis that is perpendicular to the optical sensor, and passes through a center of the optical sensor. The light reception device may be disposed such that the optical axis of the condenser optical system passes through the predetermined area and is non-parallel to the optical axis of the measurement light. Consequently, by devising the arrangement of the light reception device, it is possible to prevent the measurement light from being directly radiated on the optical sensor when the object does not exist.

In one embodiment, the optical axis of the measurement light may be perpendicular to the object, and the optical axis of the condenser optical system may be non-perpendicular to the object.

In one embodiment, the optical axis of the measurement light may be non-perpendicular to the object, and the optical axis of the condenser optical system may be perpendicular to the object.

In one embodiment, the optical axis of the measurement light may be non-perpendicular to the object, and the optical axis of the condenser optical system may be non-perpendicular to the object.

In one embodiment, the light reception device may have an entrance window and a optical axis of the light reception device is defined as a straight line that passes through a center of the entrance window and is perpendicular to the entrance window. The light reception device may be provided such that the optical axis of the light reception device is parallel to the optical axis of the measurement light, and the optical axis of the light reception device is apart from the optical axis of the measurement light. Consequently, by increasing a separation distance to some extent, it is possible to prevent the measurement light from entering the entrance window when the object is not in the predetermined area.

In one embodiment, the light reception device may further include a condenser optical system, and a mask that shields a component of the diffuse transmission light through the object to be radiated in the direction of the optical axis of the measurement light.

In one embodiment, the wavelength of the measurement light may change over time. In one embodiment, the measurement light may be pulse light whose wavelength changes over time in one pulse.

An optical measurement method according to one embodiment includes a step of repeatedly irradiating a predetermined area with the measurement light having a certain intensity; a step of conveying an object so as to pass through the predetermined area; and a step of, at an optical sensor, detecting diffuse transmission light through the object. The detecting step is performed such that a light reception amount of the optical sensor at a time when the object is in the predetermined area is larger than a light reception amount of the optical sensor at a time when the object is not in the predetermined area.

EMBODIMENTS

Hereinafter, the present disclosure will be described based on preferred embodiments with reference to the drawings. The same or equivalent components, members, and processing illustrated in each drawing will be assigned the same reference numerals, and redundant description will be omitted as appropriate. Furthermore, the embodiments do not limit the disclosure and are exemplary, and all features described in the embodiments and combinations thereof are not necessarily essential to the disclosure.

The dimension (the thickness, the length, the width, and the like) of each member described in the drawings may be appropriately enlarged or reduced for ease of understanding. Furthermore, the dimensions of a plurality of members do not necessarily indicate a relationship between numerical values of these dimensions, and even if a certain member A is drawn thicker than another member B in the drawing, the member A may be thinner than the member B.

FIG. 1 is a block diagram of an optical measurement device 100 according to the embodiment. The optical measurement device 100 is a spectrometer that measures a transmission spectrum of an object OBJ, and mainly includes an illumination device 200, a light reception device 300, a conveyance device 400, and a processing device 500.

The conveyance device 400 conveys the object OBJ crossing a predetermined area 10. Preferably, the conveyance device 400 is a belt conveyor having a caterpillar track, or a stage, and operates such that a plurality of the objects OBJ sequentially pass through the predetermined area 10.

The illumination device 200 irradiates the object OBJ existing in the predetermined area 10 with measurement light (also referred to as incident light) $S_{IN}$ whose wavelength changes over time. A time and a wavelength of this measurement light $S_{IN}$ are associated so as to have a one-to-one relationship. This relationship is referred to as that the measurement light $S_{IN}$ "has uniqueness of the wavelength". The illumination device 200 may be structured using a known technique, and, for example, those illumination devices described in Patent Literatures 1 and 2 can be used.

Figure 2:
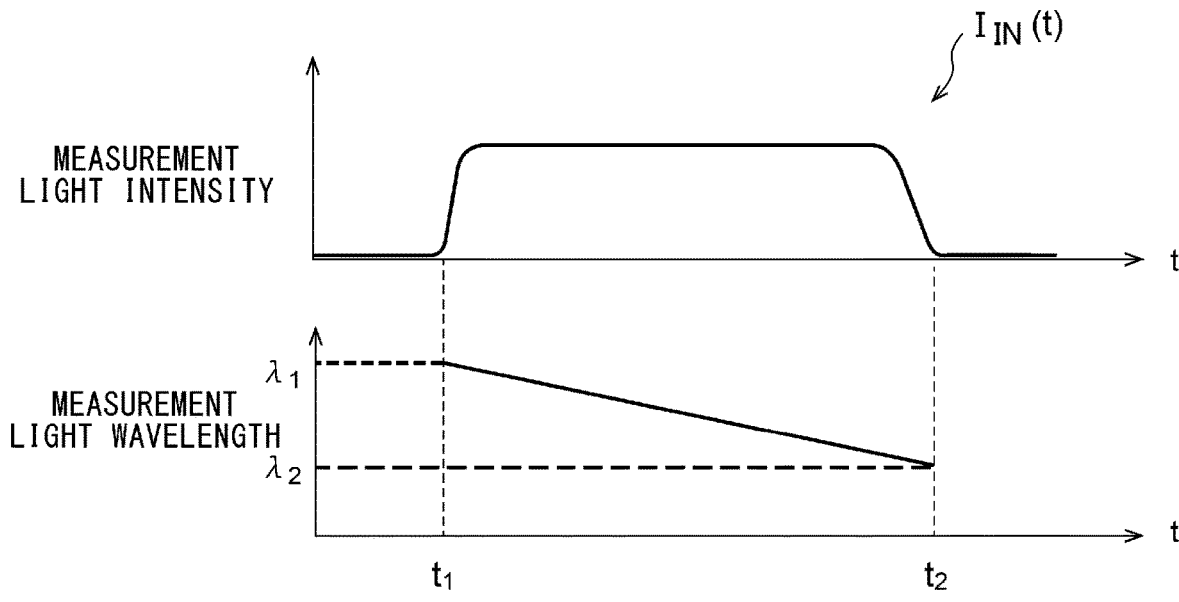
FIG. 2 is a view illustrating measurement light.

FIG. 2 is a view illustrating the measurement light $S_{IN}$. The upper part of FIG. 2 illustrates an intensity (time waveform) $I_{IN}(t)$ of the measurement light $S_{IN}$, and the lower part illustrates a temporal change of a wavelength λ of the measurement light $S_{IN}$.

In this example, the measurement light $S_{IN}$ is one pulse, the dominant wavelength is $\lambda_1$ at a front edge part thereof, the dominant wavelength is $\lambda_2$ at a rear edge part, and the wavelength changes over time between $\lambda_1$ and $\lambda_2$ in one pulse. In this example, the measurement light $S_{IN}$ is a positive chirp pulse ($\lambda_1 > \lambda_2$) whose frequency increases with time, in other words, whose wavelength decreases with time. Note that the measurement light $S_{IN}$ may be a negative chirp pulse whose wavelength increases with time ($\lambda_1 < \lambda_2$).

The description returns to FIG. 1. The measurement light $S_{IN}$ transmits through the object OBJ, and is radiated as transmission light (hereinafter, also referred to as object light) $S_{OBJ}$ from the back surface of the object OBJ. In a case where the spectrum of the measurement light $S_{IN}$ is $I_{IN}(\lambda)$, and the wavelength dependence of the transmittance of the object light $S_{OBJ}$ is T(λ), a spectrum $I_{OBJ}(\lambda)$ of the object light $S_{OBJ}$ is expressed by an equation.

$$I_{OBJ}(\lambda) = T(\lambda) \times I_{IN}(\lambda) \tag{1}$$

The object light $S_{OBJ}$ may include regular transmission light and diffuse transmission light, and the present embodiment is particularly suitable for spectrophotometric measurement of the object OBJ in which diffuse transmission light is dominant. While the regular transmission light is radiated in the same direction as that of an optical axis OA2 of the measurement light $S_{IN}$, the object light $S_{OBJ}$ that is the diffuse transmission light is widely radiated not only in the direction of the optical axis OA2 of the measurement light $S_{IN}$, but also in a direction different from the direction of the optical axis OA2. For example, when the direction of the optical axis OA2 is 0°, the diffuse transmission light is radiated with an intensity distribution of cosine characteristics.

The light reception device 300 includes an optical sensor 302 that detects the diffuse transmission light through the object OBJ as the object light $S_{OBJ}$. The light reception device 300 may include a condenser optical system and the like in addition to the optical sensor 302 as described later, but the condenser optical system is omitted in FIG. 1.

The optical sensor 302 is a photoelectric conversion element that converts an optical signal into an electric signal, and examples thereof include a photodiode, an avalanche photodiode, a phototransistor, a photomultiplier tube (photomultiplier) that uses a photoelectric effect, and a photoconductive element that uses a change in electric resistance due to light irradiation.

An output of the optical sensor 302 is converted into a digital detection signal by an A/D converter, and supplied to the processing device 500. The detection signal indicates a time waveform $I_{OBJ}(t)$ of the object light $S_{OBJ}$.

The processing device 500 generates the spectrum $I_{OBJ}(\lambda)$ of the object light $S_{OBJ}$ based on an output signal of the light reception device 300. Furthermore, the processing device 500 calculates the transmittance T(λ) of the object OBJ based on the spectrum $I_{IN}(\lambda)$ of the measurement light $S_{IN}$ and the spectrum $I_{OBJ}(\lambda)$ of the object light $S_{OBJ}$.

$$T(\lambda) = I_{OBJ}(\lambda) / I_{IN}(\lambda) \tag{2}$$

On a side closer to the illumination device 200 than to the object OBJ, part of the measurement light $S_{IN}$ may be split into another route using a beam splitter or the like, and a time waveform $I_{IN}(t)$ of the split measurement light $S_{IN}$ may be measured by a light reception device (that is not illustrated in FIG. 1, and corresponds to 810 in FIG. 11) different from the light reception device 300 to obtain the spectrum $I_{IN}(\lambda)$ of the measurement light $S_{IN}$. Alternatively, when stability of the measurement light $S_{IN}$ is high, the spectrum $I_{IN}(\lambda)$ measured in advance can be held and used.

Figure 3:
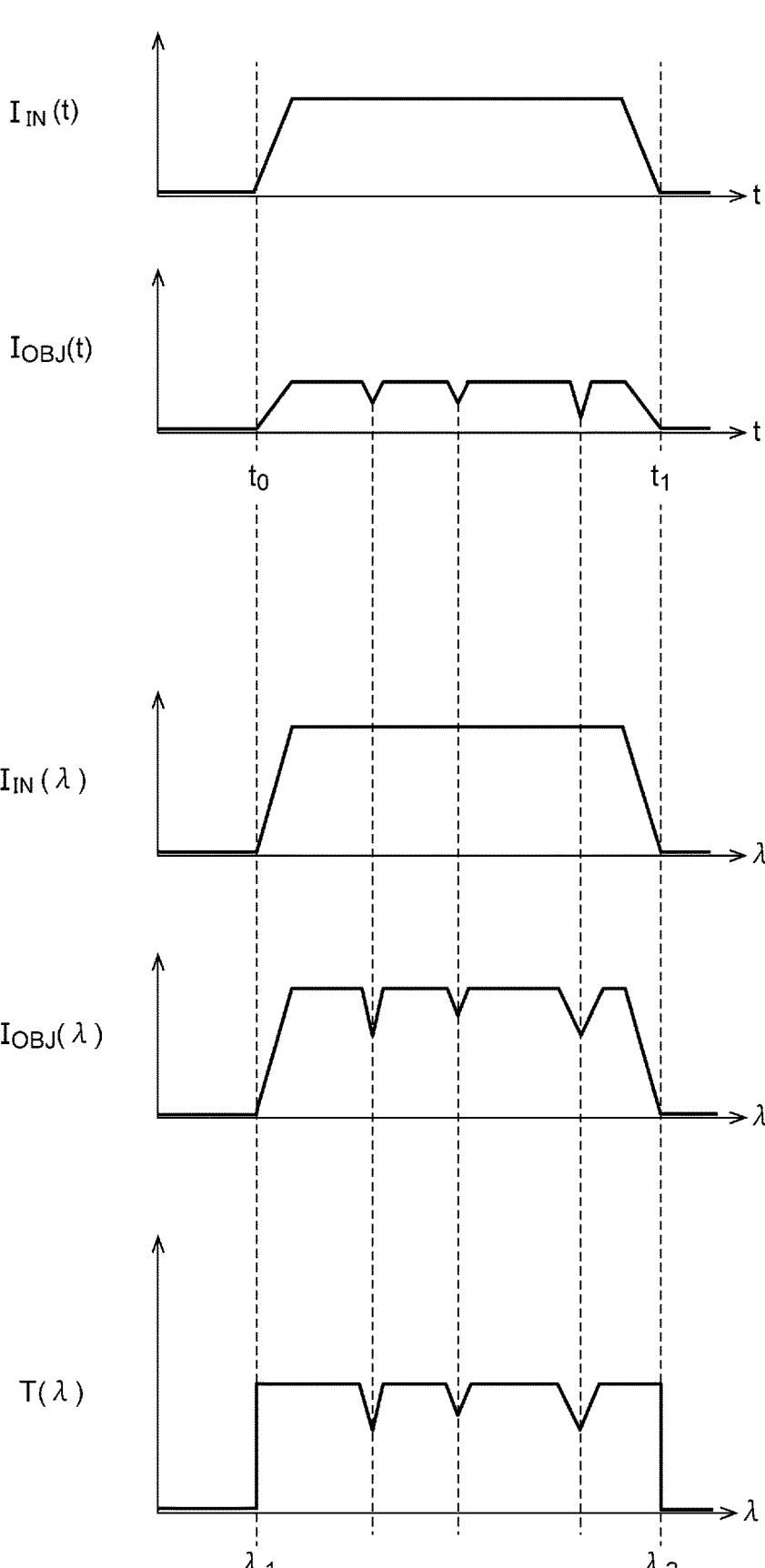
FIG. 3 is a view for describing spectrophotometry by the optical measurement device in FIG. 1.

FIG. 3 is a view for describing spectrophotometry performed by the optical measurement device 100 in FIG. 1. As described above, since a time t and the wavelength λ of the measurement light $S_{IN}$ are associated with each other on a one-to-one basis, the waveform $I_{IN}(t)$ of the time domain of the measurement light $S_{IN}$ can be converted into the spectrum $I_{IN}(\lambda)$ of the frequency domain.

The time t and the wavelength λ of the time waveform $I_{OBJ}(t)$ of the object light $S_{OBJ}$ generated from this measurement light $S_{IN}$ are also associated on a one-to-one basis. Consequently, the processing device 500 can convert the waveform $I_{OBJ}(t)$ of the object light $S_{OBJ}$ indicated by the output of the light reception device 300 into the spectrum $I_{OBJ}(\lambda)$ of the object light $S_{OBJ}$.

The processing device 500 can calculate the transmission spectrum T(λ) of the object OBJ based on a ratio $I_{OBJ}(\lambda)/I_{IN}(\lambda)$ of the two spectra $I_{OBJ}(\lambda)$ and $I_{IN}(\lambda)$.

The relationship between the time t and the wavelength λ of the measurement light $S_{IN}$ is expressed by a function λ=f(t). Most simply, the wavelength λ linearly changes with respect to the time t according to a linear function. A decrease in the time waveform $I_{OBJ}(t)$ of the object light $S_{OBJ}$ at a certain time $t_x$ means that the transmission spectrum T(λ) has an absorption spectrum at a wavelength $\lambda_x = f(t_x)$.

Note that processing of the processing device 500 is not limited thereto. The transmission spectrum T(λ) may be calculated by calculating a ratio $T(t) = I_{OBJ}(t)/I_{IN}(t)$ of the two time waveforms $I_{OBJ}(t)$ and $I_{IN}(t)$ of the time and then converting a variable t of this time waveform T(t) into λ.

The description returns to FIG. 1. It is possible to cause the illumination device 200 to continuously operate asynchronously with the conveyance device 400, and the pulsed measurement light $S_{IN}$ in FIG. 2 is repeatedly generated at a predetermined cycle. When the object OBJ does not exist in the predetermined area 10, the pulse of the measurement light $S_{IN}$ generated at this time directly propagates in the direction of the optical axis OA2 without being diffused by the object OBJ.

Assuming that the light reception device 300 is disposed on the optical axis OA2 of the measurement light $S_{IN}$, when the object OBJ does not exist on the optical axis OA2, the measurement light $S_{IN}$ of a high intensity directly enters the optical sensor 302. In order to avoid the direct entrance, the light reception device 300 is structured in the present embodiment such that a component $S_\theta$ of the diffuse transmission light (object light $S_{OBJ}$) of the object OBJ to be radiated in a direction (a deviation angle is $\theta$) deviated from the optical axis OA2 of the measurement light $S_{IN}$ enters the optical sensor 302.

Note that it is sufficient that the object light $S_{OBJ}$ in the direction of the optical axis OA2 does not enter the optical sensor 302, and the object light $S_{OBJ}$ may enter an incident aperture of the light reception device 300. This point will be described later with reference to FIG. 4B.

The configuration of the optical measurement device 100 has been described above. According to this optical measurement device 100, while, in a case where the object OBJ exists in the predetermined area 10, the object light $S_{OBJ}$ attenuated by the object OBJ enters the optical sensor 302, in a case where the object OBJ does not exist, the measurement light $S_{IN}$ does not enter the optical sensor 302, or even if the measurement light $S_{IN}$ enters the optical sensor 302, the intensity becomes very weak. Consequently, it is possible to protect the optical sensor 302 from overinput. Furthermore, it is possible to cause the illumination device 200 to continuously operate regardless of whether or not the object OBJ exists, and it is unnecessary to perform burst control of the illumination device 200 synchronized with whether or not the object OBJ exists, and add a part such as a shutter.

The present invention covers various devices and methods that are understood with reference to the block diagram in FIG. 1 or derived from the above description, and is not limited to a specific configuration. Hereinafter, more specific configuration examples and embodiments will be described in order not to narrow the scope of the present invention, but to help understanding of and clarify the essence and the operation of the invention.

A more specific configuration and layout of the light reception device 300 will be described.

First Embodiment

Figures 4A, 4B:
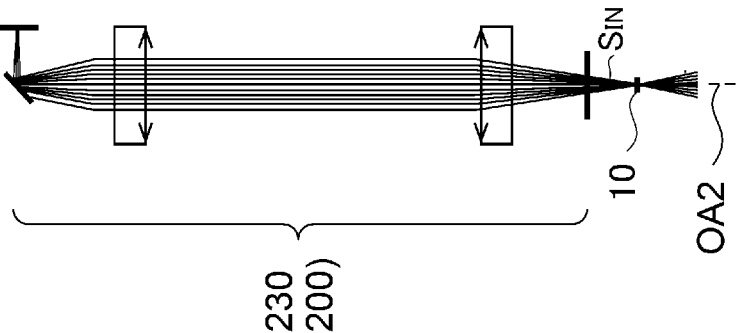
FIGS. 4A and 4B are views illustrating an optical measurement device according to a first embodiment.

FIGS. 4A and 4B are views illustrating an optical measurement device 100 according to the first embodiment. As illustrated in FIG. 4A, an irradiation optical system 230 of an illumination device 200 emits measurement light $S_{IN}$ in a direction of an optical axis OA2, and irradiates a predetermined area 10 with the measurement light $S_{IN}$. FIG. 4A illustrates a light beam in a case where an object OBJ does not exist in the predetermined area 10.

FIG. 4B illustrates a configuration example of a light reception device 300. FIG. 4B illustrates a light beam when the object OBJ exists. The light reception device 300 includes a condenser optical system 310 in addition to an optical sensor 302. An optical axis OA3 of the condenser optical system 310 matches with a perpendicular line from the center of the optical sensor 302. In this example, the condenser optical system 310 includes a first lens 314 and a second lens 316 that are coaxially arranged. The focal length of each of the first lens 314 and the second lens 316 may be determined based on a distance to the object OBJ and a distance to the optical sensor 302.

The first lens 314 brings diffuse transmission light from the object OBJ close to parallel light. The second lens 316 condenses emission light of the first lens 314. The optical sensor 302 is disposed near a focal point of the second lens 316. The second lens 316 has a smaller aperture than that of the first lens 314, and, accordingly, a component of the incident light of the first lens 314 that has a larger angle formed with an optical axis OA3 does not enter the second lens 316, and is not condensed on the optical sensor 302.

The light reception device 300 is disposed such that the optical axis OA3 of the condenser optical system 310 passes through the predetermined area 10, and is non-parallel to the optical axis OA2 of the measurement light $S_{IN}$. An inclination angle $\theta$ formed by the optical axis OA3 of the condenser optical system 310 and the optical axis OA2 of the measurement light $S_{IN}$ is defined sufficiently larger than 0°.

As described above, it is sufficient that object light $S_{OBJ}$ in the direction of the optical axis OA2 ($\theta=0°$) does not enter the optical sensor 302, and the object light $S_{OBJ}$ may enter an incident aperture of the light reception device 300. According to the configuration in FIG. 4B, the aperture of the first lens 314 is understood as the incident aperture, and, while the object light $S_{OBJ}$ in the direction of the optical axis OA2 enters the first lens 314, the object light $S_{OBJ}$ in the direction of the optical axis OA2 becomes stray light and is not condensed on the optical sensor 302. Note that a light shielding plate may be provided inside the light reception device 300 to prevent the stray light from entering the optical sensor 302.

Figure 5:
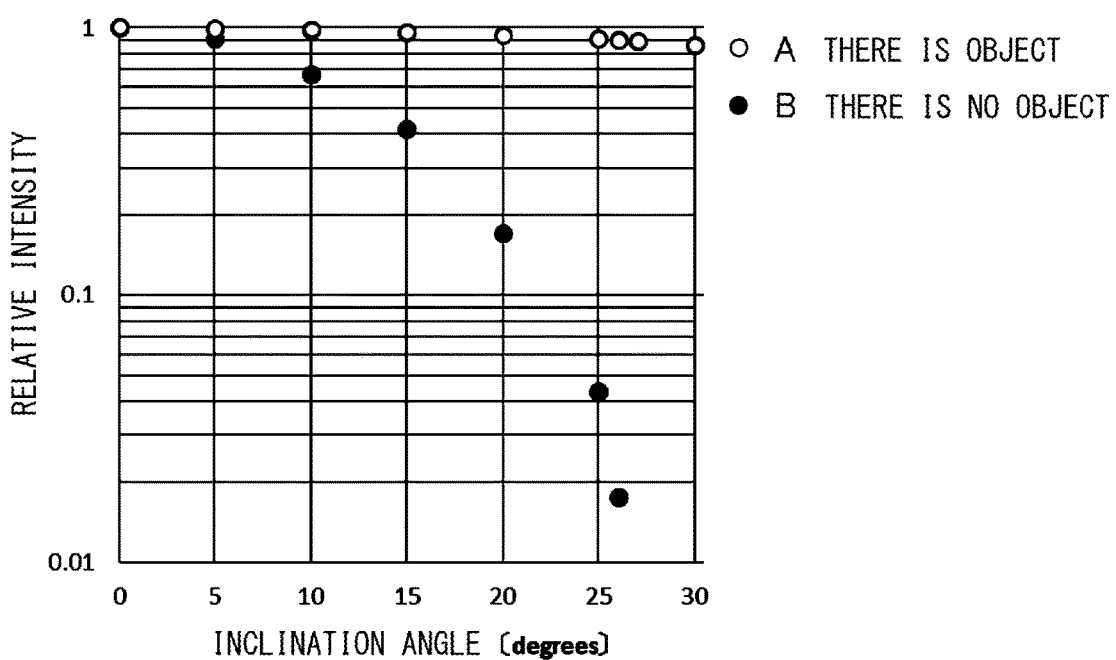
FIG. 5 is a view illustrating a relationship between an inclination angle θ and a relative detection intensity of an optical sensor in a light reception device according to the first embodiment.

FIG. 5 is a view (simulation result) illustrating a relationship between the inclination angle $\theta$ and a relative detection intensity of the optical sensor 302 in the light reception device 300 according to the first embodiment. The relative detection intensity is obtained by normalizing the detection intensity to one when the inclination angle $\theta$ is 0°. A plot A indicates the relative detection intensity when the object OBJ exists in the predetermined area 10, and the plot B indicates the relative detection intensity when the object OBJ does not exist in the predetermined area 10.

When the object OBJ exists, the relative detection intensity hardly changes even if the inclination angle $\theta$ is changed. On the other hand, when the object OBJ does not exist, the detection intensity lowers as the inclination angle $\theta$ increases. In this example, when the inclination angle $\theta$ exceeds 25°, the relative intensity goes below 0.1, and, when the inclination angle $\theta$ further exceeds 27°, the relative detection intensity becomes <0.02 and lowers to the same order as a typical transmittance of the object OBJ. Assuming that a maximum intensity of the measurement light $S_{IN}$ is $I_{IN\_MAX}$, a maximum transmittance of the object OBJ is $\eta_{MAX}$, the relative detection intensity at a time when the object OBJ exists is $A(\theta)$, the relative detection intensity when the object OBJ does not exist is $B(\theta)$, and a maximum rating of the optical sensor 302 is $I_{RATE\_MAX}$, by selecting the inclination angle $\theta$ so as to satisfy $$I_{RATE\_MAX} > I_{IN\_MAX} \times \eta_{MAX} \times A(\theta), \text{ and}$$

$$I_{RATE\_MAX} > I_{IN\_MAX} \times B(\theta),$$

it is possible to prevent power exceeding the maximum rating $I_{RATE\_MAX}$ from entering the optical sensor 302 regardless of whether or not the object OBJ exists.

Preferably, the inclination angle $\theta$ may be selected so as to satisfy $I_{RATE\_MAX} > I_{IN\_MAX} \times \eta_{MAX} \times A(\theta) \geq I_{IN\_MAX} \times B(\theta)$. Assuming that $\eta_{MAX}$ is 1%, $\theta$ may be selected so as to satisfy $$0.01 \times A(\theta) \geq B(\theta).$$

That is, a process of detecting the diffuse transmission light $S_{OBJ}$ by the light reception device 300 may be performed such that a light reception amount (incident intensity) of the optical sensor 302 at a time when the object OBJ is in the predetermined area 10 is larger than a light reception amount (incident intensity) of the optical sensor 302 at a time when the object OBJ is not in the predetermined area 10.

Note that the design of the condenser optical system 310 is not limited to that in FIG. 4, and those skilled in the art can design various optical systems that exhibit the same effect, and such optical systems are also included in the scope of the present invention. For example, in FIG. 4, the condenser optical system 310 includes two convex lenses, yet may include a combination of a concave lens and a convex lens. Furthermore, the number of lenses and the number of groups are not particularly limited. Furthermore, although $\theta > 27°$ is a condition in this example, it is needless to say that the range of this inclination angle $\theta$ depends on the design of the condenser optical system 310 of the light reception device 300.

Second Embodiment

Figure 6:
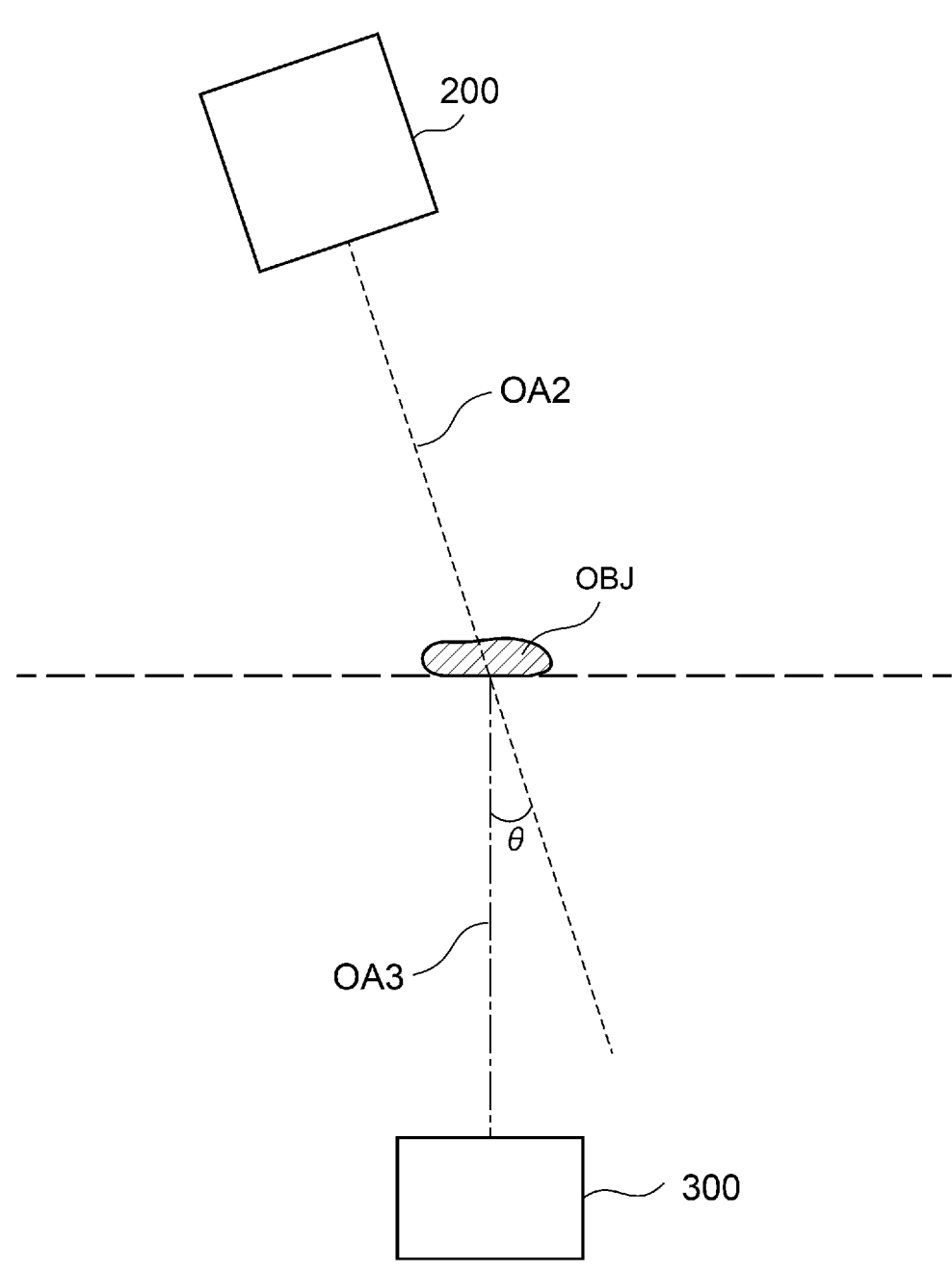
FIG. 6 is a view illustrating a light reception device according to a second embodiment.

FIG. 6 is a view illustrating a light reception device 300 according to the second embodiment. Differences from the first embodiment are that, while an optical axis OA2 of an irradiation optical system 230 is perpendicular to an object OBJ, and an optical axis OA3 of the light reception device 300 is inclined with respect to the optical axis OA2 of the irradiation optical system 230 in the first embodiment, the optical axis OA3 of the light reception device 300 is perpendicular to the object OBJ, and the optical axis OA3 of the light reception device 300 is inclined with respect to the optical axis OA2 of the irradiation optical system 230 in the second embodiment. Note that being perpendicular to the object OBJ includes being perpendicular to the object OBJ when the top surface or the back surface of the object OBJ is flat. Furthermore, when the top surface of the object OBJ is a curved surface, being perpendicular to the object OBJ includes being perpendicular to a surface on which the object OBJ is placed. The configuration of the light reception device 300 may be the same as or different from that in FIG. 4. According to this configuration, it is possible to obtain the same effects as those of the first embodiment.

Third Embodiment

Figure 7:
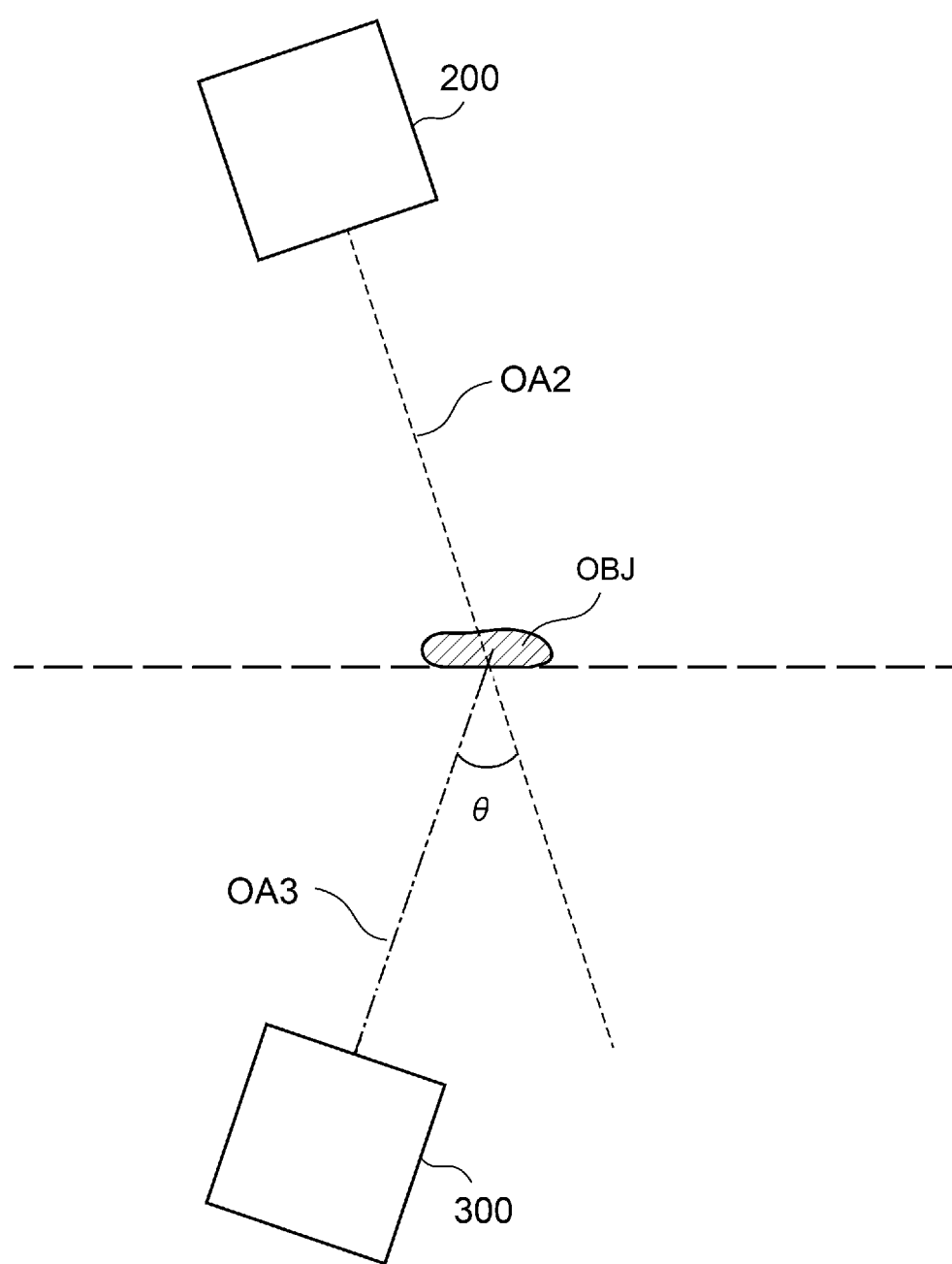
FIG. 7 is a view illustrating a light reception device according to a third embodiment.

FIG. 7 is a view illustrating a light reception device 300 according to the third embodiment. In the third embodiment, both of an optical axis OA2 of an illumination device 200 and an optical axis OA3 of the condenser optical system of the light reception device 300 are non-perpendicular to a surface on which an object OBJ is placed. The configuration of the light reception device 300 may be the same as or different from that in FIG. 4. According to this configuration, it is possible to obtain the same effects as those of the first embodiment and the second embodiment.

Fourth Embodiment

Figure 8:
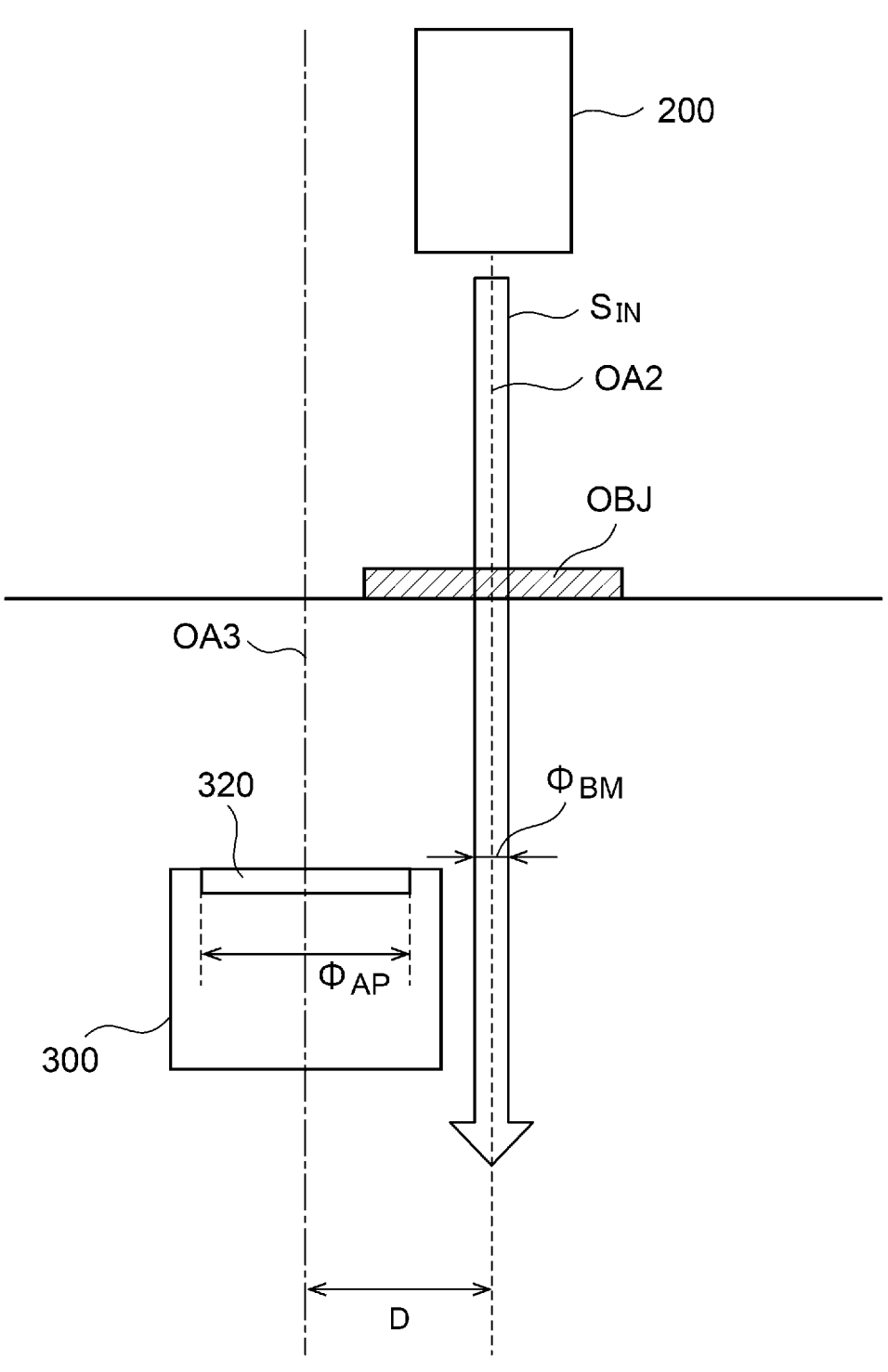
FIG. 8 is a view illustrating a light reception device according to a fourth embodiment.

FIG. 8 is a view illustrating a light reception device 300 according to the fourth embodiment. An optical axis OA3 of the light reception device 300 is defined as a straight line that passes through the center of an entrance window 320 of the light reception device 300 and is perpendicular to the entrance window 320. The entrance window 320 may be an optical member on a frontmost surface of the light reception device 300. The configuration of the light reception device 300 is not particularly limited, and the light reception device 300 is structured such that light having entered the entrance window 320 enters an internal optical sensor (not illustrated in FIG. 8). A diameter $\varphi_{AP}$ of the entrance window 320 is a range in which light having entered thereon can enter the internal optical sensor (not illustrated in FIG. 8).

In the light reception device 300, the optical axis OA3 of the light reception device 300 is substantially parallel to an optical axis OA2 of measurement light $S_{IN}$, and the optical axis OA3 of the light reception device 300 and the optical axis OA2 of the measurement light $S_{IN}$ are disposed apart from each other.

By increasing a separation distance D to some extent, it is possible to prevent the measurement light $S_{IN}$ from entering the entrance window 320, and, accordingly, from entering the optical sensor when an object OBJ is not in a predetermined area 10. When a beam diameter of the measurement light $S_{IN}$ at a position of the entrance window 320 is $\varphi_{BM}$ and the diameter of the entrance window 320 is $\varphi_{AP}$, $$D > \varphi_{AP}/2 + \varphi_{BM}/2$$

only needs to hold between the separation distance D.

Fifth Embodiment

Figure 9:
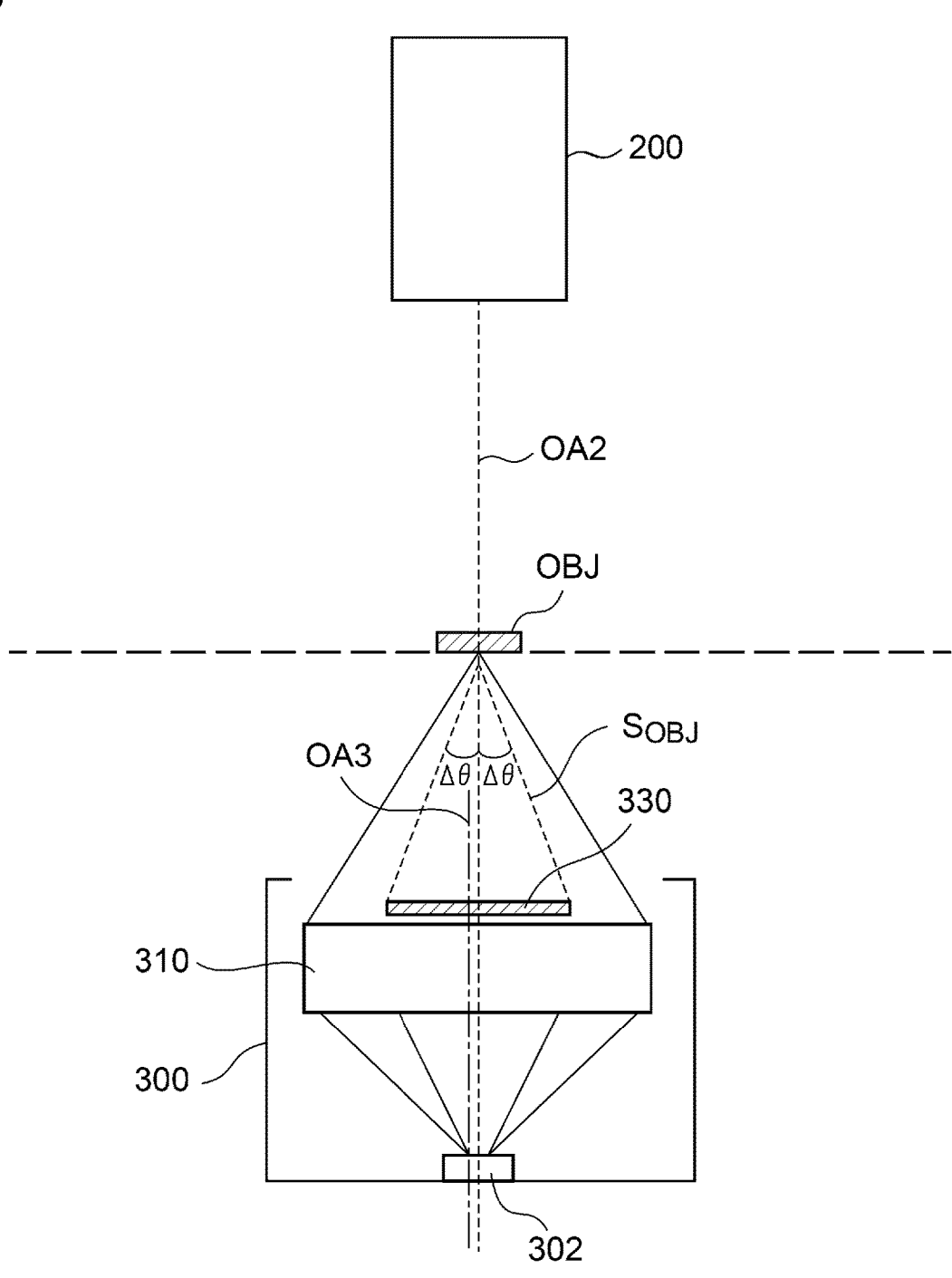
FIG. 9 is a view illustrating a light reception device according to a fifth embodiment.

FIG. 9 is a view illustrating a light reception device 300 according to the fifth embodiment. The light reception device 300 includes an optical sensor 302, a condenser optical system 310, and a mask 330. The configuration of the condenser optical system 310 is not particularly limited, yet may be structured similarly to, for example, FIG. 4. An optical axis OA3 of the light reception device 300 is disposed such that the optical axis OA3 matches with an optical axis OA2 of measurement light $S_{IN}$ (a direction of 0° of object light $S_{OBJ}$).

The mask 330 shields components of $-\Delta\theta$ to $+\Delta\theta$ of the object light $S_{OBJ}$ entering the condenser optical system 310. The position of the mask 330 is not limited, and may be provided on a side closer to an object OBJ than to the condenser optical system 310, may be provided on a side close to the optical sensor 302, or may be inserted between a plurality of lenses in a case where the condenser optical system 310 includes the lenses.

According to this configuration, by appropriately designing a diameter $\varphi_{MASK}$ of the mask 330, it is possible to prevent the measurement light $S_{IN}$ from entering the optical sensor 302 when the object OBJ is not in a predetermined area 10.

Sixth Embodiment

Figure 10:
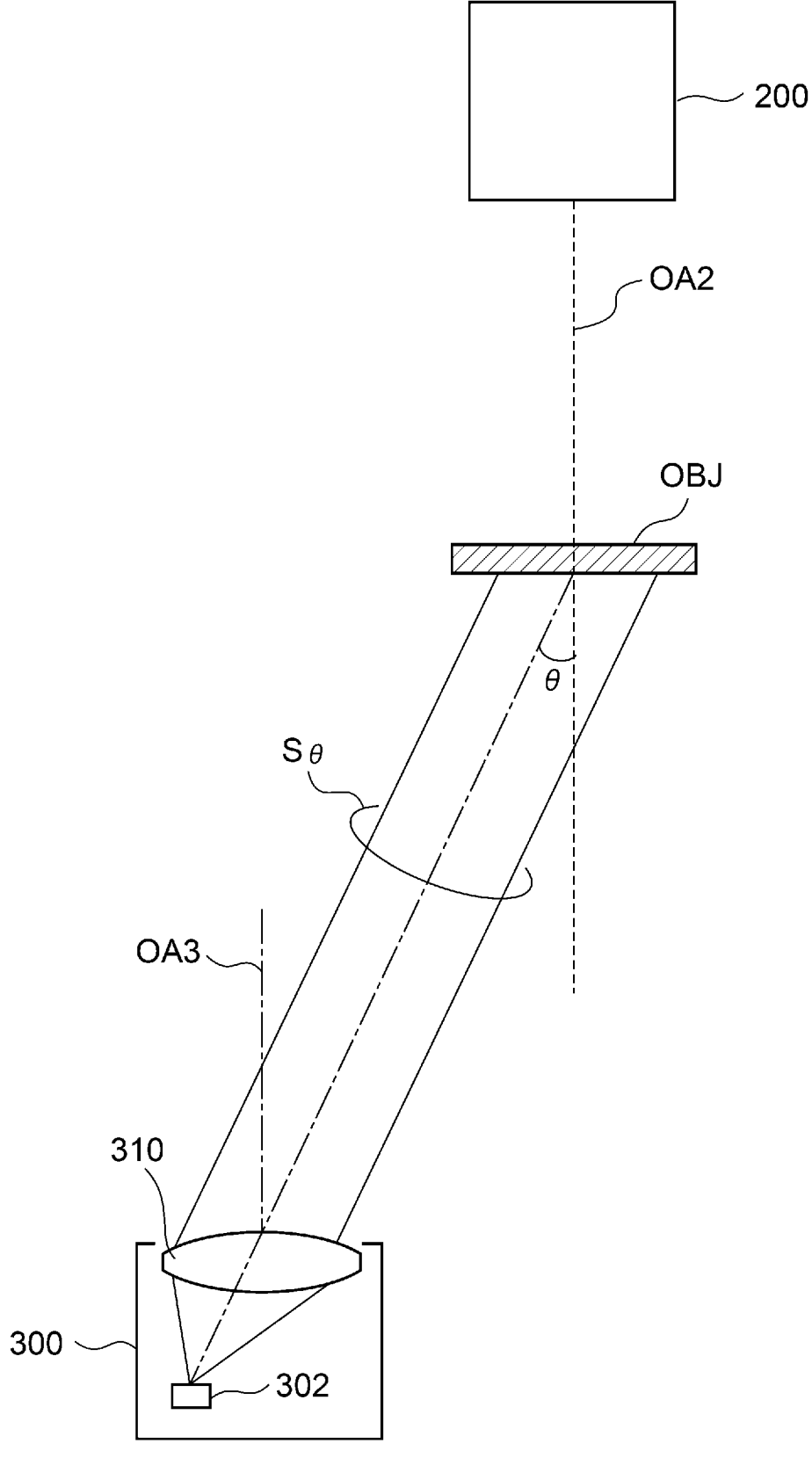
FIG. 10 is a view illustrating a light reception device according to a sixth embodiment.

FIG. 10 is a view illustrating a light reception device 300 according to the sixth embodiment. The light reception device 300 includes a condenser optical system 310 and an optical sensor 302. In this sixth embodiment, an optical axis OA3 of the condenser optical system 310 of the light reception device 300 and an optical axis OA2 of the measurement light $S_{IN}$ are parallel. However, the optical sensor 302 is not disposed on the optical axis OA3 of the condenser optical system 310, and is disposed near a position at which light having entered the condenser optical system 310 at an angle $\theta$ is condensed.

According to this configuration, the optical sensor 302 can detect a component $S_\theta$ to be radiated in a direction of $\theta$ from object light $S_{OBJ}$ radiated from the object OBJ, and, when an object OBJ is not in a predetermined area 10, it is possible to prevent measurement light $S_{IN}$ in the direction of 0° from entering the optical sensor 302.

Application

Figure 11:
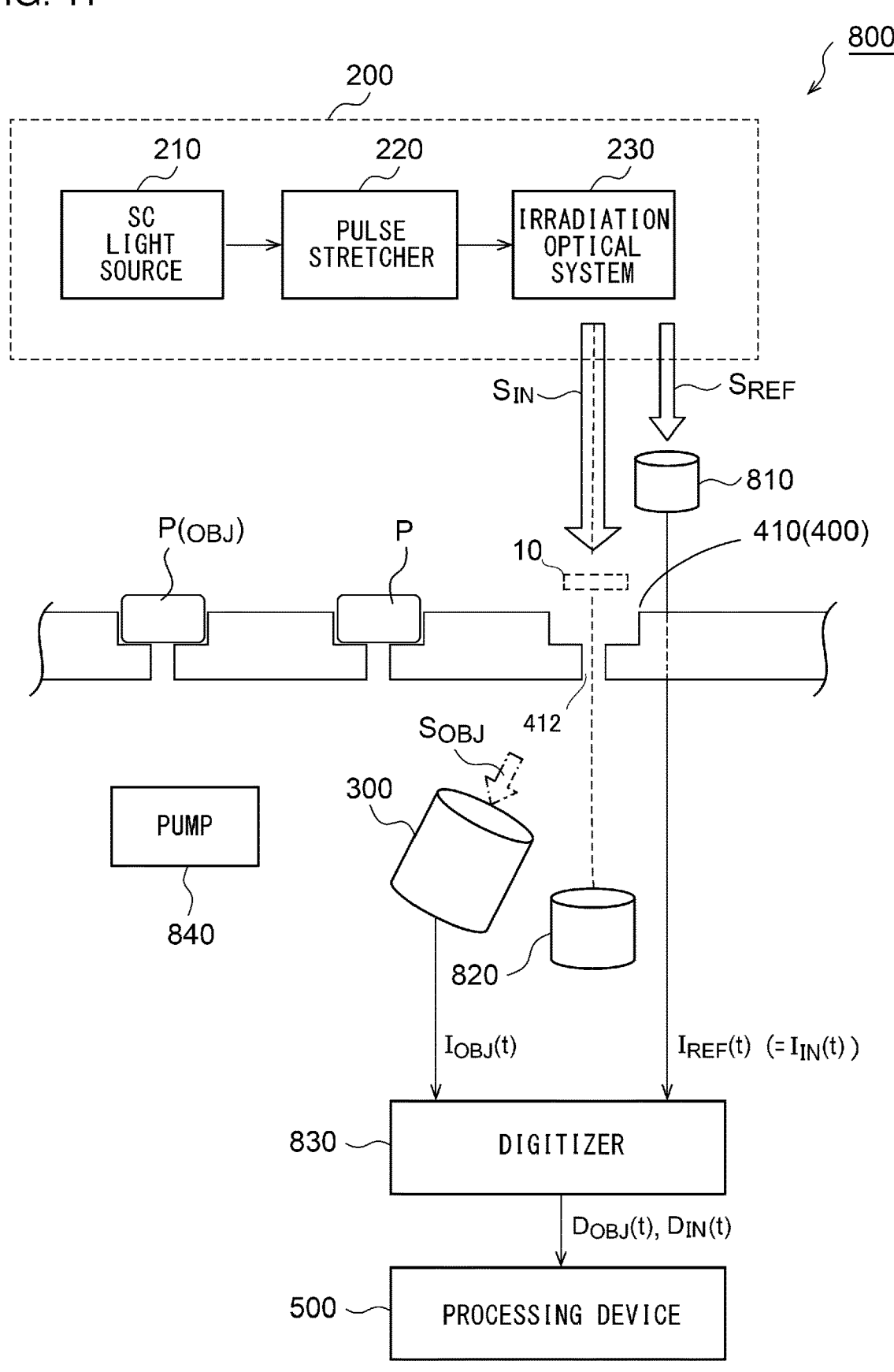
FIG. 11 is a view illustrating an inspection device that is one form of the optical measurement device.

Next, applications of an optical measurement device 100 according to the embodiments will be described. The optical measurement device 100 can be used for an inspection device for products such as food and drink obtained by solidifying powder in a solid form. FIG. 11 is a view illustrating an inspection device 800 that is one form of the optical measurement device 100. The inspection device 800 inspects a large amount of products P such as food and drink and determines whether or not the products P are good. In a case of food and drink obtained by solidifying powder in a solid form, a transmittance of this food and drink is at the order of $\frac{1}{100}$ to $\frac{1}{1000}$.

As described regarding the optical measurement device 100, the inspection device 800 includes an illumination device 200, the light reception device 300, a conveyance device 400, and a processing device 500. Furthermore, the inspection device 800 includes a light reception device 810, a beam damper 820, a digitizer 830, and a pump 840.

The illumination device 200 includes a light source 210, a pulse stretcher 220, and an irradiation optical system 230. The light source 210 generates coherent pulse light having a continuous spectrum of at least 10 nm, more specifically, a broad continuous spectrum in in a near infrared range of 900 to 1300 nm. The light source 210 may be a Super Continuum (SC) light source that includes a pulsed laser and a non-linear element. As the pulse laser, a mode-locked laser, a microchip laser, a fiber laser, or the like can be used. As the non-linear element, a non-linear fiber such as a photonic crystal fiber can be used.

The pulse stretcher 220 stretches the pulse width of the pulse light generated by the light source 210 such that the time and the wavelength are associated with each other on a one-to-one basis. The pulse stretcher 220 may be structured as one wavelength dispersion fiber.

Alternatively, the pulse stretcher 220 may include a demultiplexer that splits pulse light into a plurality of routes per wavelength, a plurality of fibers (fiber bundles) that give different delay to each of the plurality of paths, and a multiplexer that recombines outputs of the plurality of fibers. The demultiplexer can include Planar Lightwave Circuits (PLCs), and, more specifically, may include an Array Waveguide Grating (AWG). The plurality of fibers constituting the fiber bundle have different lengths.

The conveyance device 400 includes a holder 410. The plurality of products P are placed on the holders 410 by a mounter (not illustrated) on an upstream side (a left side in the figure). Although the holders 410 are not limited thereto, the holder 410 may be a recess part that is formed on a flat surface. The conveyance device 400 moves the holder 410 in a movable direction thereof. Note that, of the surfaces of the holder 410, the surface on which the product P is placed is referred to as a top surface, and the surface opposite to the top surface is referred to as a back surface.

The irradiation optical system 230 irradiates the predetermined area 10 with the stretched pulse as the measurement light $S_{IN}$. The predetermined area 10 is defined at a portion on the holder 410 at which the products P pass. The irradiation optical system 230 can include a transmission optical system such as a lens, a reflection optical system such as a mirror, or a combination thereof. As the holder 410 moves, the plurality of products P sequentially cross the predetermined area 10.

The light source 210 repeatedly generates pulse light at a predetermined frequency (cycle). An operating frequency of the light source 210 may be determined according to a moving speed of the holder 410, that is, the conveyance speed of the products P, and is determined such that the same product P is irradiated with a plurality of beams of the measurement light $S_{IN}$ while the one product P exists in the predetermined area 10.

The operation of the light source 210 is independent of the operation of the holder 410, in other words, the position of the product P. Therefore, even when the product P does not exist in the predetermined area 10, the measurement light $S_{IN}$ is repeatedly radiated on the predetermined area 10.

The light reception device 300 is provided on the back surface side of the holder 410. The holder 410 has a through-hole 412. This through-hole 412 is formed to guide the diffuse transmission light (object light) $S_{OBJ}$ from the product P to the light reception device 300 on the back surface side.

The pump 840 may be provided on the back surface side of the holder 410. The pump 840 constitutes suction means and applies a negative pressure to the back surface side of the holder 410, and then the product P sticks to the holder 410, so that it is possible to prevent the product P from rolling or being deviated on the holder 410 as the holder 410 is conveyed. On the other hand, when the product P does not fit in the holder 410, and the product P does not exist in the predetermined area 10, the measurement light $S_{IN}$ passes through this through-hole 412, and leaks to the back surface side on which the light reception device 300 exists.

The configuration and the arrangement of the light reception device 300 are as described above, and the measurement light $S_{IN}$ does not enter the optical sensor 302 inside the light reception device 300 when the product P does not exist in the predetermined area 10. The light reception device 300 measures a time waveform $I_{OBJ}(t)$ of the object light $S_{OBJ}$. Furthermore, the beam damper 820 is provided on the optical axis OA2 of the measurement light $S_{IN}$ to prevent stray light.

The light reception device 810 is provided to measure the spectrum of the measurement light $S_{IN}$. The irradiation optical system 230 splits part of the measurement light $S_{IN}$ as reference light $S_{REF}$ to another arm using a beam splitter or the like. The light reception device 810 measures a time waveform $I_{REF}(t)$ of the reference light $S_{REF}$ split to another arm. This time waveform $I_{REF}(t)$ is equivalent to a time waveform $I_{IN}(t)$ of the measurement light $S_{IN}$.

The digitizer 830 includes an A/D converter, samples outputs of the light reception device 300 and the light reception device 810, that is, the time waveforms $I_{OBJ}(t)$ and $I_{REF}(t)$ at a predetermined sampling frequency, and converts the time waveforms into waveform data $D_{OBJ}(t)$ and $D_{IN}(t)$ of digital signals.

In the case where the light reception devices 300 and 810 of digital outputs are used, the digitizer 830 can be omitted.

The processing device 500 processes the digital waveform data $D_{OBJ}(t)$ and $D_{IN}(t)$, and obtains transmission characteristics (or absorption characteristics) $T(\lambda)$ of the product P. The processing device 500 may be implemented as a combination of general-purpose or dedicated computers including a processor and storage media such as memories and hard disks, and software programs. The processing of the processing device 500 is as described above.

The configuration of the inspection device 800 has been described above. According to this inspection device 800, it is possible to protect the light reception device 300 when the product P does not exist in the predetermined area 10. At this time, it is possible to make the light source 210 of the illumination device 200 run free asynchronously with the operation of the conveyance device 400, and it is unnecessary to perform shutter control synchronized with the operation of the conveyance device 400.

The embodiments merely describe the principle and the application of the present invention, and many modified examples and changes in arrangement are allowed for the embodiments without departing from the spirit of the present invention defined in the claims.

What is claimed is:

1. An optical measurement device comprising:

a conveyance device having a through-opening through which light passes, the conveyance device being structured to hold an object by negative pressure applied via the through-opening and to convey the object so as to pass through a predetermined region;

an illumination device structured to irradiate a predetermined area with measurement light whose wavelength changes over time; and a light reception device including an optical sensor structured to detect diffuse transmission light through the object passing through the predetermined area, wherein the optical measurement device is structured such that an optical path from the illumination device to the light reception device passes through the through-opening, and only the object is present on the optical path, and the light reception device is structured such that the optical sensor receives a component of the diffuse transmission light through the object which propagates in a direction deviated from an optical axis of the measurement light.

2. The optical measurement device according to claim 1, wherein the light reception device further includes a condenser optical system having an optical axis that is perpendicular to the optical sensor and passes through a center of the optical sensor, and wherein the light reception device is disposed such that the optical axis of the condenser optical system passes through the predetermined area, and is non-parallel to the optical axis of the measurement light.

3. The optical measurement device according to claim 2, wherein the optical axis of the measurement light is perpendicular to the object, and the optical axis of the condenser optical system is non-perpendicular to the object.

4. The optical measurement device according to claim 2, wherein the optical axis of the measurement light is non-perpendicular to the object, and the optical axis of the condenser optical system is perpendicular to the object.

5. The optical measurement device according to claim 2, wherein the optical axis of the measurement light is non-perpendicular to the object, and the optical axis of the condenser optical system is non-perpendicular to the object.

6. The optical measurement device according to claim 1, wherein the light reception device has an entrance window and an optical axis of the light reception device is defined as a straight line that passes through a center of the entrance window and is perpendicular to the entrance window, and wherein the light reception device is disposed such that the optical axis of the light reception device is parallel to the optical axis of the measurement light, and the optical axis of the light reception device is apart from the optical axis of the measurement light.

7. The optical measurement device according to claim 1, wherein the light reception device further includes a condenser optical system, and a mask structured to block the component of the diffuse transmission light through the object which propagates in the direction of the optical axis of the measurement light.

8. The optical measurement device according to claim 1, wherein the measurement light is pulse light whose wavelength changes over time in one pulse.

* * * * *